United States Patent
Rank et al.

(10) Patent No.: US 7,793,210 B2
(45) Date of Patent: Sep. 7, 2010

(54) METHOD AND APPARATUS FOR FORMULA EVALUATION IN SPREADSHEETS ON SMALL DEVICES

(75) Inventors: Paul J. Rank, San Jose, CA (US); John C. Pampuch, Morgan Hill, CA (US)

(73) Assignee: Oracle America, Inc., Redwood City, CA (US)

(*) Notice: Subject to any disclaimer, the term of this patent is extended or adjusted under 35 U.S.C. 154(b) by 1120 days.

(21) Appl. No.: 09/774,354

(22) Filed: Jan. 30, 2001

(65) Prior Publication Data

US 2002/0143829 A1 Oct. 3, 2002

(51) Int. Cl.
*G06F 17/00* (2006.01)
*G06F 9/45* (2006.01)

(52) U.S. Cl. ............... 715/212; 715/219; 715/249; 715/267; 717/136; 717/140

(58) Field of Classification Search ........... 715/503, 715/538, 501.1, 504, 523, 200, 201, 203, 715/212, 226, 239, 242, 248, 249, 255, 273, 715/700, 205, 209, 210, 219, 229, 231, 234, 715/256, 267, 276; 345/169; 709/232, 237; 710/61; 717/106, 136, 137, 140

See application file for complete search history.

(56) References Cited

U.S. PATENT DOCUMENTS

| | | | | |
|---|---|---|---|---|
| 5,055,998 A | * | 10/1991 | Wright et al. | 715/503 |
| 5,339,410 A | * | 8/1994 | Kanai | 707/999.1 |
| 5,471,612 A | | 11/1995 | Schlafly | |
| 5,604,854 A | * | 2/1997 | Glassey | 715/503 |
| 5,633,998 A | | 5/1997 | Schlafly | |
| 5,893,123 A | * | 4/1999 | Tuinenga | 715/504 |
| 5,953,730 A | * | 9/1999 | Schawer | 715/210 |
| 5,963,919 A | * | 10/1999 | Brinkley et al. | 705/28 |

(Continued)

FOREIGN PATENT DOCUMENTS

EP 0 924 611 A2 6/1999

(Continued)

OTHER PUBLICATIONS iambic, Inc., "Tinysheet -Excel spreadsheet software for Palm OS—Clie, Treo, Zire, Tungsten & other PDAs", http://www.google.com, pp. 1-5, Copyright 1998.*

(Continued)

*Primary Examiner*—Laurie Ries
*Assistant Examiner*—Maikhanh Nguyen
(74) *Attorney, Agent, or Firm*—Marsh Fischmann & Breyfogle LLP; Kent A. Lembke; J. D. Harriman, II

(57) ABSTRACT

A method and apparatus is provided for enabling a spreadsheet program with formula support on small devices (like PDAs) while minimizing the amount of memory space used by the program and the accompanying compiled code during transfer of files from the desktop to the small devices. The user can download a spreadsheet file from the desktop to the small device via a conduit. A conduit is any 2-way communication device which connects a desktop to a small device and allows the transfer of data. Conduit software can convert the data to be transferred into a format understandable by both the desktop and PDA programs. The conduit software can also evaluate and parse the formulas and functions needed by the current file before the transfer and generate compiled code for the functions needed by the current file before transfer.

12 Claims, 8 Drawing Sheets

U.S. PATENT DOCUMENTS

| | | | |
|---|---|---|---|
| 6,487,597 B1 * | 11/2002 | Horie et al. | 709/227 |
| 6,718,425 B1 * | 4/2004 | Pajakowski et al. | 710/315 |
| 2001/0041021 A1 * | 11/2001 | Boyle et al. | 382/305 |
| 2001/0047441 A1 * | 11/2001 | Robertson | 710/65 |
| 2002/0065939 A1 * | 5/2002 | Liu | 709/248 |

FOREIGN PATENT DOCUMENTS

| WO | WO 98/36344 | 8/1998 |
|---|---|---|

OTHER PUBLICATIONS

Hassinen, Kari et al., "Structured Spreadsheet Calculation", IEEE Languages for Automation Workshop, pp. 129-133, 1998.*

David W. Bynon, "VAX XWAY," DEC Professional, Sep. 1987, Philadelphia, PA, vol. 6, Nr. 9, pp. 108 and 110, XP000747272.

David J. Molta, "Coefficient's Vterm/220 Links PCs to DEC via Multiple Protocols," Hardcopy, Jan. 1988, USA, vol. 8, Nr. 1, pp. 90-92, XP009011133.

* cited by examiner

Prior Art

FIGURE 3A1
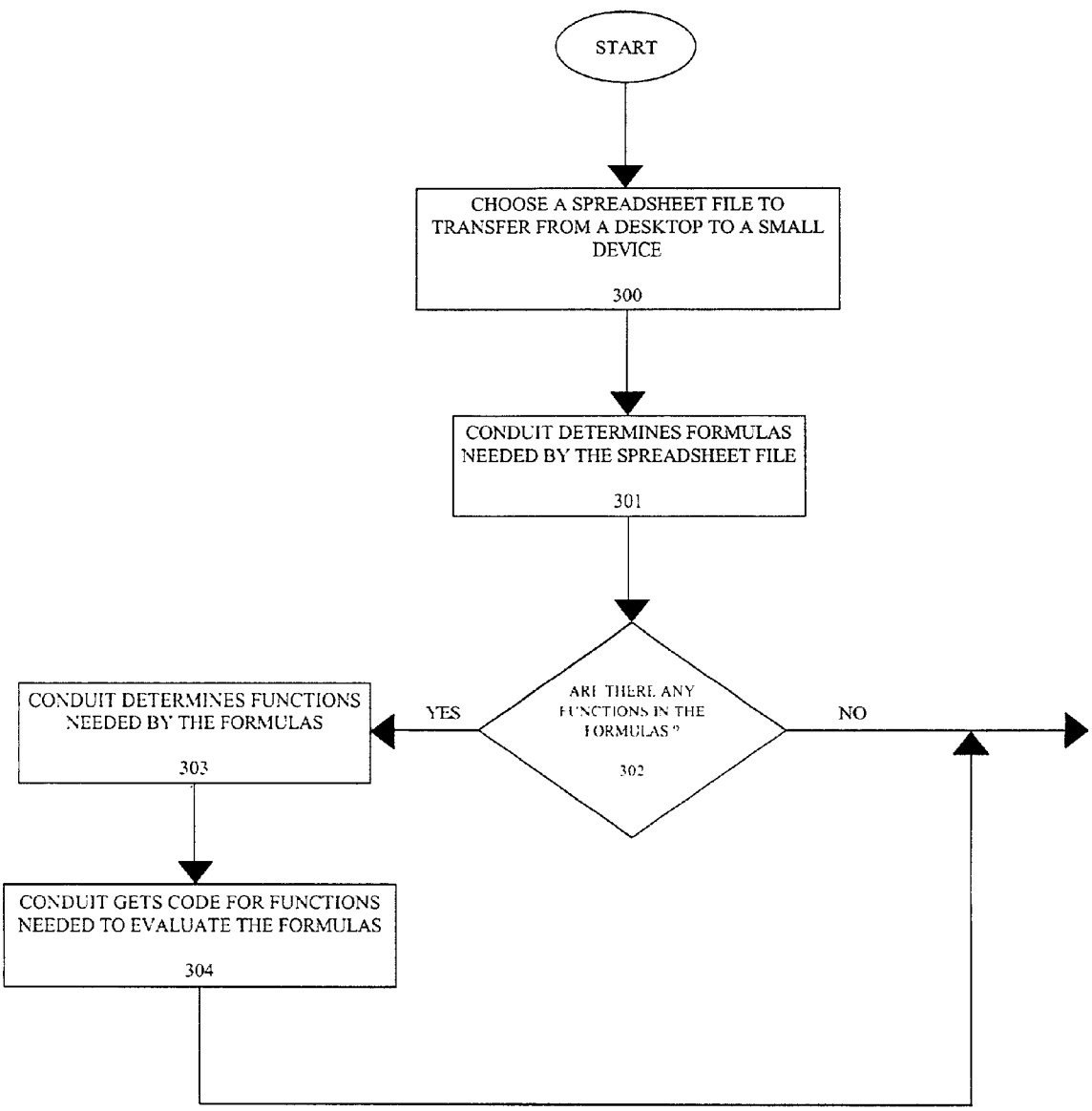

FIGURE 3A2
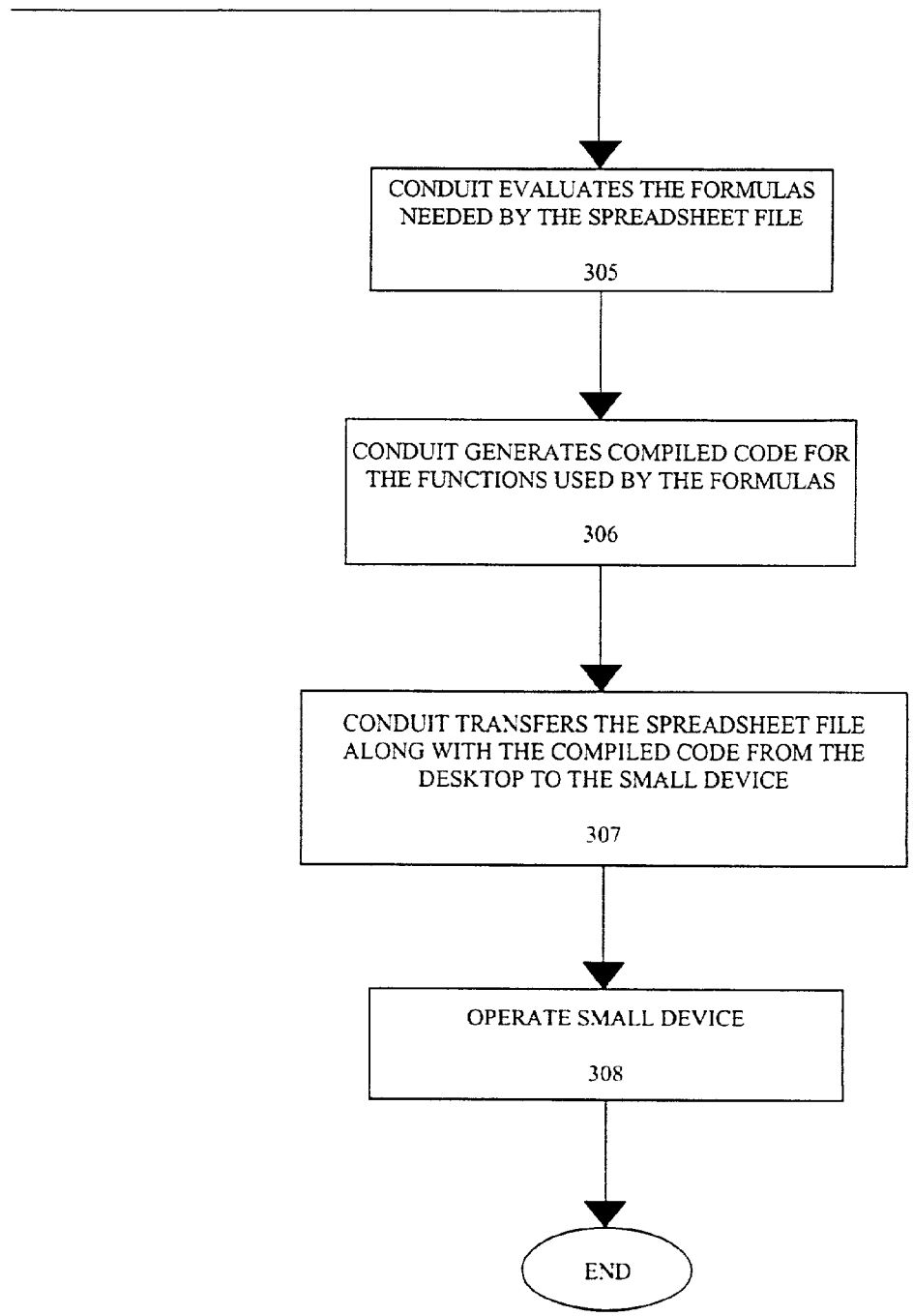

FIGURE 4 - PDA COUPLED TO
A GENERAL PURPOSE COMPUTER
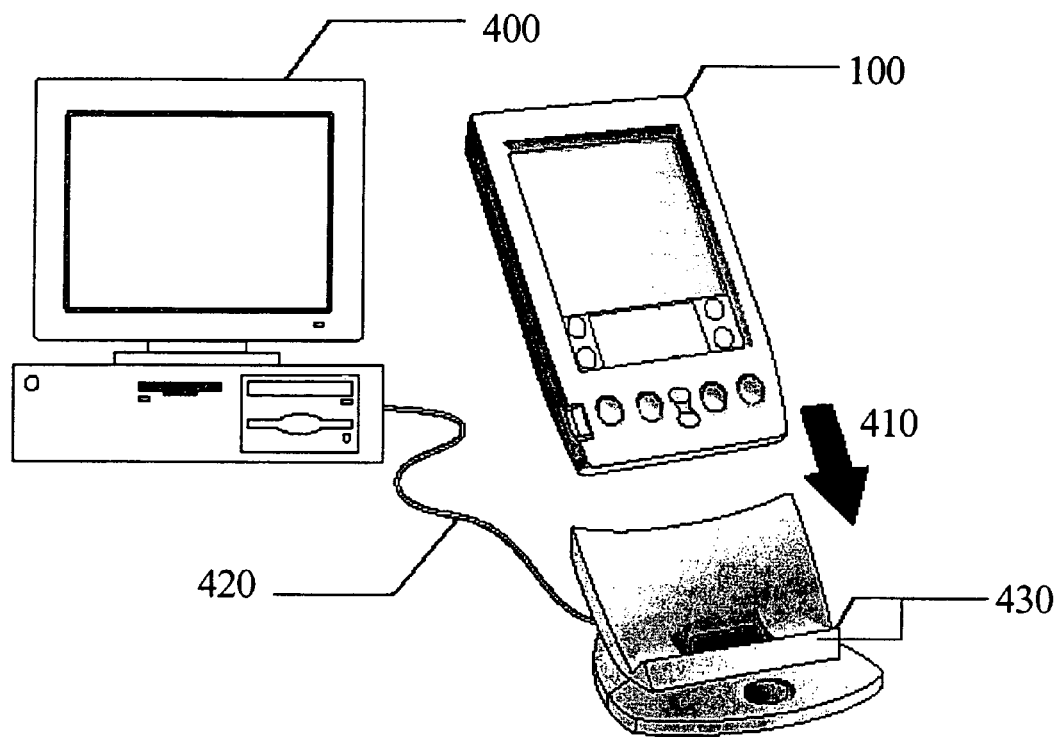
Prior Art

FIGURE 6A

| Employee workweek (09-04-2000 to 09-10-2000) ||||||| 
|---|---|---|---|---|---|---|
| Name (Last, First) | Hours Worked | Rate/Hour | Gross Pay | FICA | SDI | Net Pay |
| Adams, John | 50.25 | 35 | 1758.75 | 100.24 | 53.86 | 1604.65 |
| Blue, Sally | 54.3 | 45 | 2443.5 | 124.23 | 56.78 | 2262.49 |
| Hallaway, Tom | 52 | 30 | 1560 | 103.64 | 48.12 | 1408.24 |
| Morgan, Tracy | 53.7 | 45 | 2416.5 | 113.92 | 52.79 | 2249.79 |
| Swift, Robert | 57 | 50 | 2850 | 124.4 | 57.53 | 2668.07 |
| Total: | | | 11028.75 | 566.43 | 269.08 | 10193.24 |

FIGURE 6B

| Los Angeles - Rainfall Totals For 1999 (in inches) | | | | | | |
|---|---|---|---|---|---|---|
| Month | Total | SD | Average | Variance | High | Low |
| January | 11.76 | 0.006 | 0.75 | 0.000045 | 4.2 | 0.01 |
| February | 2.78 | 0.0005 | 0.23 | 0.0000061 | 1.1 | 0.001 |
| March | 1.94 | 0.00001 | 0.04 | 0.0000014 | 0.36 | 0 |
| April | 0.72 | 0.00003 | 0.002 | 0.000001 | 0.3 | 0 |
| May | 0.4 | 0.000002 | 0.00036 | 0.0000004 | 0.004 | 0 |
| June | 0.001 | 0.00000001 | 0.000001 | 0.00000012 | 0.000024 | 0 |
| July | 0.001 | 0.00000001 | 0.000001 | 0.00000014 | 0.000045 | 0 |
| August | 0.0025 | 0.000000034 | 0.000006 | 0.00000014 | 0.000024 | 0 |
| September | 0.0063 | 0.000000067 | 0.000004 | 0.00000024 | 0.000031 | 0 |
| October | 0.00945 | 0.000000078 | 0.000079 | 0.00000072 | 0.00007 | 0.0001 |
| November | 3.67 | 0.00000017 | 0.034 | 0.00000037 | 0.96 | 0.0014 |
| December | 5.48 | 0.00067 | 0.73 | 0.000049 | 1.1 | 0.003 |
| Total for '99 | 26.77025 | | | | | |

METHOD AND APPARATUS FOR FORMULA EVALUATION IN SPREADSHEETS ON SMALL DEVICES

BACKGROUND OF THE INVENTION

1. Field of the Invention

The invention relates primarily to the field of computer software, and in particular to a method and apparatus for formula evaluation in spreadsheets on small devices, such as Personal Digital Assistants (henceforth referred to as PDAs).

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

PDAs are small hand-held computers that perform a plurality of tasks. Like conventional computers, PDAs have memory. Memory is necessary for the execution of a task. Some of these tasks, like calendar and appointment schedules, are simple and require very little memory. Others, like spreadsheet applications, are complex and require a lot of memory. When users want to use memory intensive applications on a PDA, such as a spreadsheet program, they encounter problems because PDAs by their nature have a limited amount of memory.

Computer users sometimes wish to use the same applications and data sets on their PDA that they use on their general purpose computer (or desktop). However, the format of the files used on similar programs on both the PDA and desktop is very different. This is due to the fact that the operating system that controls a PDA is different from a desktop operating system. Because of the different operating systems, the same kind of programs for both the PDA and desktop require different amounts of memory. PDA version programs may sometimes use more memory than is available on the PDA. In some cases, a user may need to quit programs and delete data from their PDA in order to make room for a data set, especially for large programs like a spreadsheet application. This limits the versatility of the PDA. Before further discussing the drawbacks associated with PDAs, a general description of PDAs is provided below.

PDA

A PDA is a small computer-like device, usually no larger than the palm of a human hand, which typically has a base housing with an input mechanism mounted on its topside, and a miniature display screen for output. FIG. 1 is an illustration of one embodiment of a personal digital assistant. The PDA shown in FIG. 1 at 100 may be a handheld computing device, such as those manufactured by Palm™. PDA 100 has a base housing 160 usually with input mechanisms mounted on its topside, and a miniature display screen 110 for output. The base housing 160 of the PDA typically contains a small microprocessor, data storage and memory areas, a storage battery, and other various miniature electronic components. The electronic components and other features vary depending on the model, make, and manufacturer of the PDA. PDA 100 can be activated and de-activated, for instance, by accessing power button 150.

PDA output may take the form of either graphic and/or textual images presented to users on the miniature display screen 110, or may be presented to users in the form of sound. The input mechanism may be, for example, a miniature keyboard (not shown). Alternatively, the miniature display screen 110 may act as both an input and output mechanism. When used as an input mechanism, the user inputs the data via a pen-like stylus or other writing implement (not shown) directly on the display screen. This could take the form of handwriting, or highlighting certain specific areas on the display screen such as buttons, icons, or captions. With reference to FIG. 1, bottom portion 120 of display screen 110 is where the user would input using the pen-like stylus. Shown in FIG. 1 are additional mechanisms for user input as well, including a scroll button 130 and an application button 140.

Conventional PDAs also contain an operating system, and pre-loaded programs, such as word processing, spreadsheet, e-mail, calendar, memo list, stylus pen applications, and other related applications. The increasing popularity of PDAs stems from their relatively low cost and extreme portability compared to, for example, much larger desktop general purpose desktop computers. Their popularity also stems from the fact that they can communicate with most popular desktop applications like spreadsheet programs, word processing programs, e-mail, etc. This makes transfer of data from one to the other very convenient and useful. Because of this versatility, many users find that for simple computing tasks during trips and other periods of being away from their larger computer devices, the bulk and computing power of even a compact notebook (or laptop) computer are simply not needed.

Conduit

A conventional way of transferring data is by way of a conduit. FIG. 4 is designed to generally indicate how a user transfers data from a desktop CPU 400 to a PDA 100, or vice-versa. Desktop CPU 400 is coupled to PDA carriage 430 via a connecting line 420. The connecting line 420 represents a conduit.

A conduit provides a two-way data communication coupling via a desktop CPU 400 to a PDA 100. Although, conduit 420 represents a cable connection, it will be apparent to one skilled in the art, that the present invention may be practiced with numerous types of connections. For example, if the conduit is an integrated services digital network (ISDN) card or a modem, the conduit provides a data communication connection to the corresponding type of telephone line. Additionally, wireless links are available to the present invention. In any such implementation, the conduit sends and receives electrical, electromagnetic or optical signals, which carry digital data streams representing various types of information. The conduit software controls the data flow over the conduit.

In operation, a user would insert PDA 100 into carriage 430 in the direction generally indicated by the black arrow 410. Thereafter, data is passed bi-directionally across conduit 420 to achieve the result of either transferring the user's data from PDA 100 to desktop CPU 400, or vice versa.

PDA Spreadsheet Problems

Memory

To encapsulate all of this functionality into such a small device, trade-offs invariably occur. One trade-off is that PDAs do not have the capacity to house a large amount of memory. Computer memory is a critical component that directly impacts the PDA's processing speed and performance. Furthermore, PDA memory is necessary to store data and instructions that a running computer program utilizes. Multi-functional and complex applications require large amounts of memory to operate because these applications require large amounts of data and instructions. For example, a conventional PDA today has up to 8 megabytes of memory space, whereas a conventional desktop computer can have hundreds of megabytes of memory, or more. As such, computer programs running on PDAs are limited in the functionality they can provide to a user by the amount of memory available.

PDA Spreadsheet Problems

Formula Parsing and Evaluation

A spreadsheet application requires a lot of memory to store individual documents called files. These spreadsheet files usually possess some formulas that may consist of functions. Functions may be stored with other related functions in groups commonly known as function packages. An example of a function package is the statistical function package, which may include such functions as mean, median, and mode. Other examples of function packages include trigonometric, matrix, statistical, and mathematical function packages. The types and amount of functionality contained within a file depend on what users are attempting to accomplish with their assignment.

Spreadsheet File

A spreadsheet file contains a collection of data tabulated in a grid or matrix. The grid is numbered horizontally starting from "A", and numbered vertically starting from "1". Each space in the grid is termed a cell, and FIG. 6A shows an example of a spreadsheet file with 50 cells (Heading cell followed by 7 columns and 7 rows). This example has text and numbers as cell entries, but could contain other information like date, time, special symbols, etc. The relationship between the cells can sometimes be controlled by formulas. FIG. 6A shows the employee workweek of a company, including name of employees, their hourly rates, number of hours worked in the week, payroll deductions like FICA and SDI, and the gross and net pays. So, for example, the net pay is calculated using the formula (hours worked*rate/hour)−(FICA+SDI). By changing the value in the rate/hour column, or the hours worked column automatically changes the value in gross pay, net pay, FICA, and SDI columns because they are all dependent on the rate/hour as well as hours worked.

FIG. 6B shows another example of a spreadsheet file with 99 cells (a Heading cell followed by 14 rows and 7 columns). The data in the cells is made up of text and numbers. The formulas that control the numbers in some of the cells in this example are very complex and make use of several functions. For example, the SD column, which stands for standard deviation, uses not only the variance formula for its calculation, but also the square root function. The variance in turn uses the square, average, and summation functions. Hence changing just one value can start a chain reaction of values being changed in several columns.

A spreadsheet program places a heavy demand on PDA memory because of its numerous and complex features. Some of the features that tax the memory include complex functions, such as trigonometric, matrix, statistical, and mathematical functions, and functional features like fonts, pictures, graphics, and help menus. Since functions are used by formulas, complex functions mean complex formulas, which implies more burden on the already taxed PDS.

Complex spreadsheet files use numerous functions, subsets of function packages, or entire function packages, all of which use numerous complex formulas to compute the task. The functions are either a part of the spreadsheet application, or library. These formulas have to be parsed and evaluated, and the code needed for that can sometimes take up more memory space than the complex formulas themselves. This forces the PDA makers to either have their users forgo some of their favorite applications in order to make memory space available for a spreadsheet file which uses complex functions and formulas, or limit the functionality of the spreadsheet file to simple functions and formulas that do not require large amounts of memory space.

Function Packages

A function package refers to a plurality of functions that in some way are related. A function package may include, for instance, trigonometric functions. As previously discussed, a spreadsheet application may utilize a plurality of packages. Each function in the package in turn may be used by one or more formulas. So for example, a trigonometric function package may contain formulas for sine, cosine, and tangent. A statistical function package may contain formulas for mean, median, and mode.

Formula

A formula is a combination of signs in a logical calculus, or a general fact, rule, or principle expressed in usually mathematical symbols. For example, to calculate the area of a two dimensional object, certain symbols and rules are needed. Hence to calculate the area of a circle, we need the product of the constant Pi (the value 3.14 . . . ) and the square of the radius of the circle. The square of the radius can be calculated in one of two ways: a) by multiplying the radius by itself once, or b) by using the Square function. The code to calculate the area is very different for both the above options. If a) is chosen, then the C code may look like:

```
/******************************************
Area of the circle = A, and is an integer value.
Radius of the circle = r, and is an integer value.
******************************************/
.
.
.
#define Pi = 3.142857;
.
.
.
void main ()
{
int       A, r;
printf"Radius of circle is: \n";     /* Program asks user to input a integer value for the radius */
scanf"%r\n";                          /* The inputted value is scanned by the program */
A = Pi * r * r;                       /* The area is calculated */
printf"Area of the circle with radius %r is %A\n\n";  /* Result of program is outputted */
}                                     /* end of main */
}                                     /* end of file */
```

If on the other hand option b) is chosen, then the C code using the Square function would look like:

```
/*********************************************
        Area of circle = A, and is an integer value.
        Radius of circle = r, and is an integer value.
*********************************************/
.
.
.
#define Pi = 3.142857;
.
.
.
int Square (int r)      /* Sub-routine to calculate square of radius */
{
        return r * r;
}
.
.
.
void main ()
{
        int A;
printf"Radius of circle is: \n";     /* Program asks user to input a integer value for the radius */
scanf"%r\n";                          /* The inputted value is scanned by the program */
A = Pi * Square(r);
printf"Area of the circle with radius %r is %A\n\n"; /* Result of program is outputted */
}                                     /* end of main */
}                                     /* end of file */
```

The multiplication function code may in turn be written in terms of addition to cut down on system time and memory. Hence, for example, 2 times 3 could be written as 2*3, or 2+2+2. The formula to calculate the area of a circle is an example which either uses just the multiplication operation (which in turn can use the addition operation), or uses a combination of the multiplication and square operations. Other complex formulas can run into several pages of C code, using several complex functions, numerous operations and universal symbols like Pi.

Conventional PDAs, because of their limited memory space availability, can be restricted in their task performing versatility. A spreadsheet program can become very large and complex if all the features found on the desktop version are included in the PDA. A large and complex program takes up the bulk of the limited memory space and that either slows down the speed of the PDA, or the user may have to delete some other favorite smaller programs, or the user may have to attach external memory cards to accommodate the larger program. Formula parsing and evaluation, especially on spreadsheet programs that use trigonometric, matrix, statistical, scientific, mathematical, or financial function packages, can further take up valuable memory space, and cut down on PDA performance.

SUMMARY OF THE INVENTION

The present invention provides a method and apparatus for enabling a spreadsheet program with formula support on small devices (such as PDAs) while minimizing the amount of memory used by the program. In one or more embodiments, the present invention allows the user to choose a spreadsheet file to be downloaded to the small device by way of a conduit and conduit software. A conduit is a two way communication device that connects a desktop to a small device and allows the transfer of data. The conduit software controls the data flow over the conduit.

Since the operating system of the desktop and the small device are different, one embodiment of the invention uses the conduit as a tool for converting the data to be transferred from the desktop to a format understandable by the small device's operating system.

According to one embodiment, part of the conversion stage involves gathering all the formulas needed by the present transfer and evaluating them. Evaluation involves generating compiled code that the spreadsheet program of the small device can understand. Moving the formula parsing and evaluation from the small device's spreadsheet program to the conduit allows the small device application to leave out this functionality. This optimizes the limited amount of memory space that is so critical to a small device's operating speed and performance.

In another embodiment, the present invention allows for function codes, which are used by the formulas, not to be stored on the small device. This further reduces the space requirements and improves the performance and operating speed of the small device.

BRIEF DESCRIPTION OF THE DRAWINGS

These and other features, aspects and advantages of the present invention will become better understood with regard to the following description, appended claims and accompanying drawings where:

FIGS. 3A1 and 3A2 are a flowchart showing all the steps needed to transfer a spreadsheet file along with all the necessary functions and compiled formulae code from a desktop to a small device according to one embodiment of the present invention.

FIG. 4 is an illustration of one embodiment of a PDA coupled with a desktop computer via a conduit.

FIG. 6A is an illustration of a spreadsheet program that may be used in an embodiment of the present invention showing the work week of the employees of a company.

FIG. 6B is another illustration of a spreadsheet program that may be used in an embodiment of the present invention showing the rainfall totals for the city of Los Angeles for 1999.

DETAILED DESCRIPTION

Figure 1:
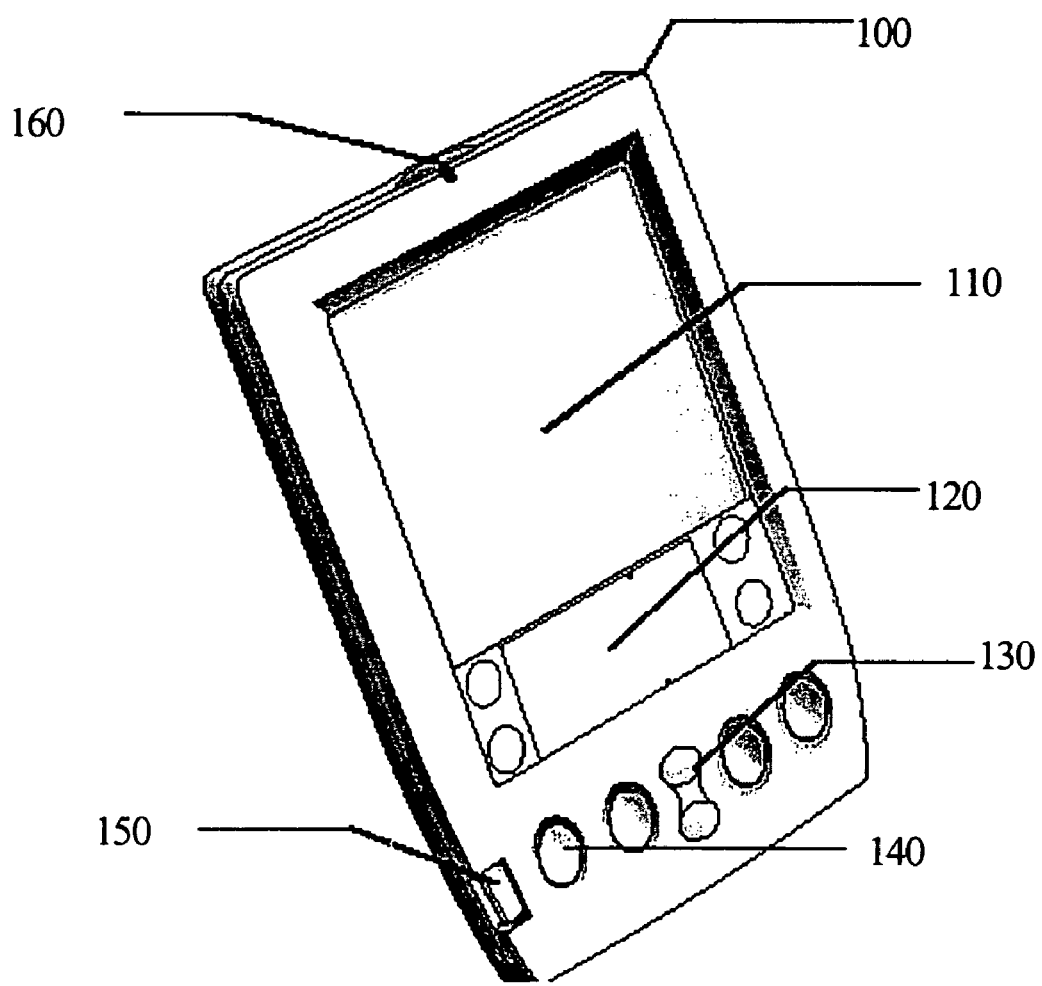
FIG. 1 is an illustration of one embodiment of a personal digital assistant.

An interface for transferring a spreadsheet from a desktop to a small device is described. In the following description, numerous specific details are set forth in order to provide a more detailed description of the invention. It will be apparent, however, to one skilled in the art, that the present invention may be practiced without these specific details. In other instances, well known details have not been provided so as to not unnecessarily obscure the invention.

One or more embodiments of the present invention provide a method of transferring a spreadsheet program from a desktop to a PDA. PDAs are small devices that users can operate almost anywhere. Yet, due to their size, PDAs only contain a limited amount of memory. This limitation is demonstrated when users operate programs, such as spreadsheet applications with complex formulas that use large amounts of memory.

Some basic spreadsheet files may only contain a single function or formula. On the other hand, some complex files may contain numerous functions, subsets of function packages, and/or entire function packages. A complete description of function loading is contained in co-pending U.S. patent application submitted by the present assignee, and entitled "Method For Dynamic Function Loading In Spreadsheets On Small Devices" application Ser. No. 09/754,415 filed on Jan. 2, 2001. Since a formula uses one or more functions, if the functions are complex, so is the formula. The formulas needed by the functions have to be parsed and evaluated individually. After which, compiled code of the formulas is generated. Evaluating and parsing of the formulas, as well as generating compiled code is necessary even though the application, in this case the spreadsheet program, using the file is the same on both the desktop and small device. This is because the operating system of the desktop is different from that of the small device.

Because of the difference in the kind of operating system, the formats of the files and the accompanying formulas and functions are different. In the prior art, parsing and evaluation of the formulas, and the generation of the compiled code of the formulas thereafter are done by the respective spreadsheet programs in the desktop or small device. For a desktop, this process is easily accomplished by its spreadsheet program as there is sufficient memory available. However, this process is very memory intensive which can be problematic on the small device due to limited memory.

An advantage is created by the present invention because it enables a spreadsheet program with formula support on a small device while minimizing the amount of memory space. One way the present invention reduces the amount of small device memory constraints is by performing formula parsing and evaluation outside the memory space of the small device. In one embodiment, this is achieved by having the conduit perform the task of parsing all the formulas needed by the current transfer. Still another way the present invention reduces the amount of small device memory constraints is by having the conduit generate the compiled code for the formulas once the parsing is done. While either of the steps are being performed, the conduit software can optimize the generated results. Both of these methods combined leave memory free on the small device, which saves much of the overhead of formula parsing and evaluation.

Figure 2A:
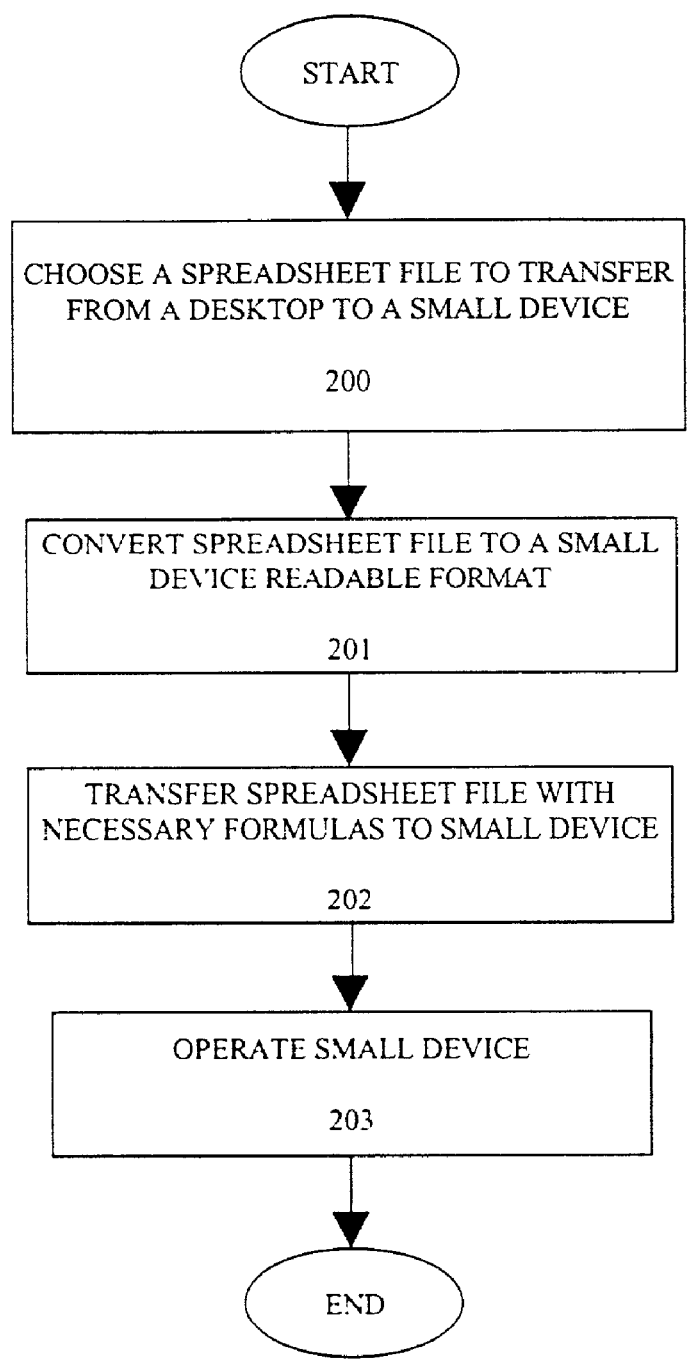
FIG. 2A is a flowchart showing a transfer of a spreadsheet file along with the necessary formulas from a desktop to a small device according to one embodiment of the present invention.

One embodiment of the present invention operates generally in accordance with FIG. 2A, which is a flow chart for transferring a spreadsheet file from a desktop to a small device. First, at step 200, the user chooses the spreadsheet file to be transferred to the small device. Next, at step 201, the spreadsheet file is converted to a small device readable format. This conversion may be accomplished, in one embodiment of the invention, by the conduit software. Next, at step 202, the spreadsheet file along with the necessary parsed formulas is transferred to the small device. The spreadsheet file containing compiled code permits the spreadsheet application to be simpler and, therefore, more compact. Finally, at step 203, the user can use the transferred file on the small device.

FIGS. 3A1 and 3A2 are a flowchart showing how to download a spreadsheet file from a desktop to a small device according to one embodiment of the present invention. At step 300, the spreadsheet file to transfer is determined. Next, at step 301, the conduit software determines the formulas needed by the current spreadsheet file. Next, at step 302, if the formula has one or more functions, then the conduit determines not only the functions at step 303, but also generates the code needed to evaluate the functions at step 304. The code generated will be similar to the earlier C code generated to calculate the area of a circle. Else, at step 305, the conduit evaluates the formulas needed by the current transfer, and at step 306 it generates the compiled code that the small device's spreadsheet program will understand. By having the conduit perform steps 301 through 306, not only is the small device's (or PDA's) memory not taxed, but formula parsing and evaluation problems that we see in prior art are also eliminated. This can also improve the performance on the small device. At step 307, the conduit transfers the chosen spreadsheet file along with the necessary compiled code for the functions and formulas across to the small device. Finally, at step 308, the user can now use the transferred file on the small device.

Embodiment of a Computer Execution Environment

Figure 5:
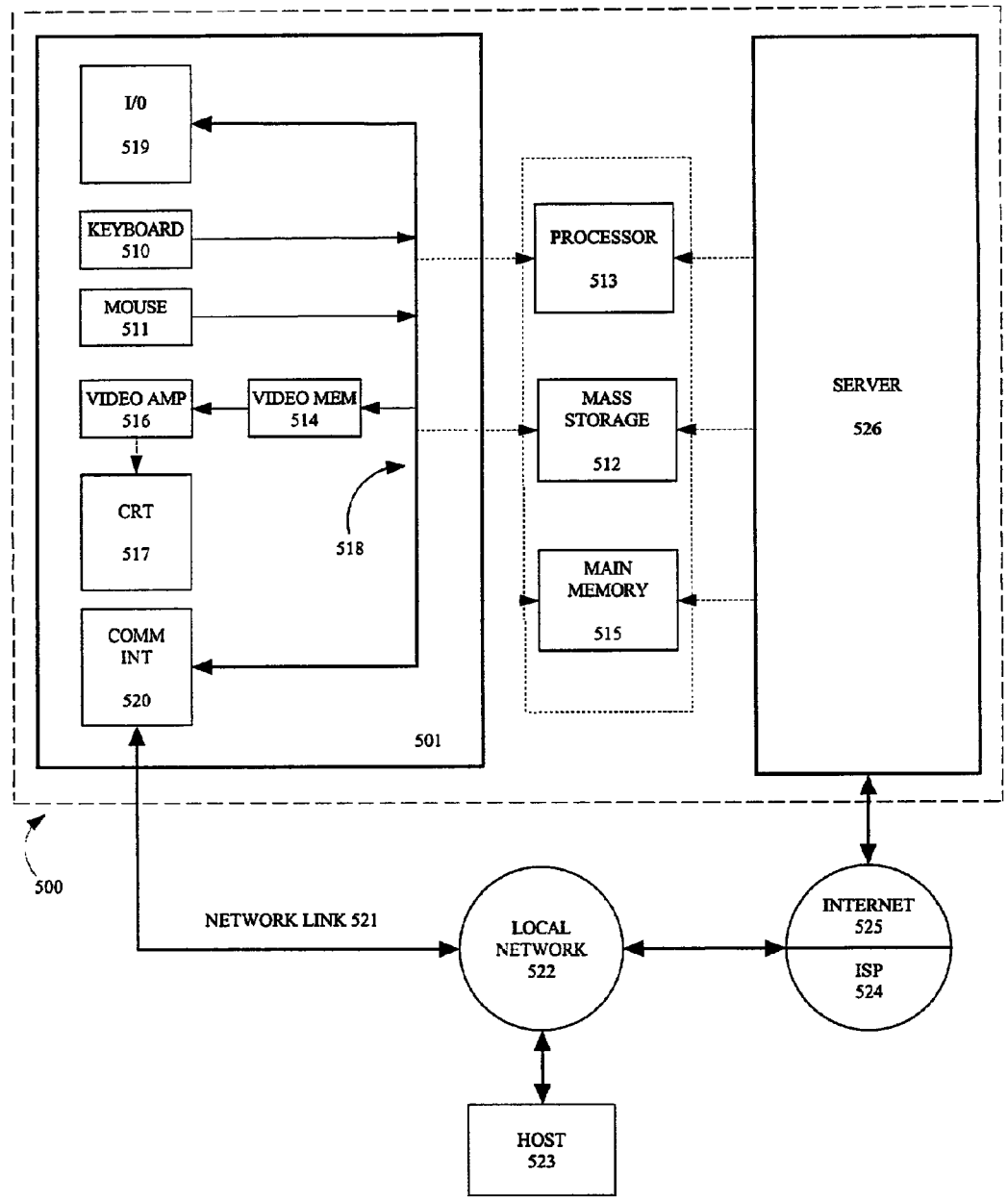
FIG. 5 is an illustration of an embodiment of a computer execution environment.

An embodiment of the invention can be implemented as computer software in the form of computer readable code executed in a desktop general purpose computing environment such as environment 500 illustrated in FIG. 5, or in the form of bytecode class files running in such an environment. A keyboard 510 and mouse 511 are coupled to a bi-directional system bus 518. The keyboard and mouse are for introducing user input to a computer 501 and communicating that user input to processor 513.

Computer 501 may also include a communication interface 520 coupled to bus 518. Communication interface 520 provides a two-way data communication coupling via a network link 521 to a local network 522. For example, if communication interface 520 is an integrated services digital network (ISDN) card or a modem, communication interface 520 provides a data communication connection to the corresponding type of telephone line, which comprises part of network link 521. If communication interface 520 is a local area network (LAN) card, communication interface 520 provides a data communication connection via network link 521 to a compatible LAN. Wireless links are also possible. In any such implementation, communication interface 520 sends and receives electrical, electromagnetic or optical signals, which carry digital data streams representing various types of information.

Network link 521 typically provides data communication through one or more networks to other data devices. For example, network link 521 may provide a connection through local network 522 to local server computer 523 or to data equipment operated by ISP 524. ISP 524 in turn provides data communication services through the world wide packet data communication network now commonly referred to as the "Internet" 525. Local network 522 and Internet 525 both use electrical, electromagnetic or optical signals, which carry digital data streams. The signals through the various networks and the signals on network link 521 and through communication interface 520, which carry the digital data to and from computer 500, are exemplary forms of carrier waves transporting the information.

Processor 513 may reside wholly on client computer 501 or wholly on server 526 or processor 513 may have its computational power distributed between computer 501 and server 526. In the case where processor 513 resides wholly on server 526, the results of the computations performed by processor 513 are transmitted to computer 501 via Internet 525, Internet Service Provider (ISP) 524, local network 522 and communication interface 520. In this way, computer 501 is able to display the results of the computation to a user in the form of output. Other suitable input devices may be used in addition to, or in place of, the mouse 511 and keyboard 510. I/O (input/output) unit 519 coupled to bi-directional system bus 518 represents such I/O elements as a printer, A/V (audio/video) I/O, etc.

Computer 501 includes a video memory 514, main memory 515 and mass storage 512, all coupled to bi-directional system bus 518 along with keyboard 510, mouse 511 and processor 513.

As with processor 513, in various computing environments, main memory 515 and mass storage 512, can reside wholly on server 526 or computer 501, or they may be distributed between the two. Examples of systems where processor 513, main memory 515, and mass storage 512 are distributed between computer 501 and server 526 include the thin-client computing architecture developed by Sun Microsystems, Inc., PDAs, Internet ready cellular phones, and other Internet computing devices.

The mass storage 512 may include both fixed and removable media, such as magnetic, optical or magnetic optical storage systems or any other available mass storage technology. Bus 518 may contain, for example, thirty-two address lines for addressing video memory 514 or main memory 515. The system bus 518 also includes, for example, a 32-bit data bus for transferring data between and among the components, such as processor 513, main memory 515, video memory 514, and mass storage 512. Alternatively, multiplex data/address lines may be used instead of separate data and address lines.

In one embodiment of the invention, the processor 513 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 515 is comprised of dynamic random access memory (DRAM). Video memory 514 is a dual-ported video random access memory. One port of the video memory 514 is coupled to video amplifier 516. The video amplifier 516 is used to drive the cathode ray tube (CRT) raster monitor 517. Video amplifier 516 is well known in the art and may be implemented by any suitable apparatus. This circuitry converts pixel data stored in video memory 514 to a raster signal suitable for use by monitor 517. Monitor 517 is a type of monitor suitable for displaying graphic images.

Computer 501 can send messages and receive data, including program code, through the network(s), network link 521, and communication interface 520. In the Internet example, remote server computer 526 might transmit a requested code for an application program through Internet 525, ISP 524, local network 522 and communication interface 520. The received code may be executed by processor 513 as it is received, and/or stored in mass storage 512, or other non-volatile storage for later execution. In this manner, computer 500 may obtain application code in the form of a carrier wave. Alternatively, remote server computer 526 may execute applications using processor 513, and utilize mass storage 512, and/or video memory 515. The results of the execution at server 526 are then transmitted through Internet 525, ISP 524, local network 522, and communication interface 520. In this example, computer 501 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, and servers on a network.

The computer systems described above are for purposes of example only. An embodiment of the invention may be implemented in any type of computer system or programming or processing environment.

Thus, a method and apparatus for enabling spreadsheet programs with formula support on small devices while minimizing the amount of memory space required by the program is described in conjunction with one or more specific embodiments. Further, the function codes needed by the formula are not stored on the small device further reducing the memory space constraints. The invention is defined by the claims and their full scope of equivalents.

The invention claimed is:

1. A method in a data processing system including at least a first and a second device for evaluating a spreadsheet file, the method comprising:
   obtaining, by a conduit in said data processing system, said spreadsheet file in a first format on said first device;
   converting, by said conduit, said spreadsheet file to a second format associated with said second device, such that said spreadsheet file when in said second format occupies less memory space than said spreadsheet file when in said first format and wherein said converting takes place outside of a memory of said second device and further comprises:
   determining one or more formulas associated with said spreadsheet file that are necessary for the operation of the spreadsheet file on said second device; and
   parsing and evaluating the one or more formulas and compiling code associated with the one or more formulas while converting said spreadsheet file to said second format; and
   transferring, by said conduit, said spreadsheet file to said second device.

2. The method of claim 1 wherein said first device is a computer.

3. The method of claim 2 wherein said second device is a small device.

4. The method of claim 3 wherein said small device is a Personal Digital Assistant (PDA).

5. A computer program product comprising:
a non-transitory computer-readable medium having computer readable program code embodied therein configured to evaluate a spreadsheet file, said computer program product comprising:
computer readable code configured to cause a conduit to obtain said spreadsheet file in a first format on a first device wherein said conduit includes a computer processor configured to read the computer readable program code;
computer readable code configured to cause said conduit to convert said spreadsheet file to a second format associated with a second device, such that said spreadsheet file when in said second format occupies less memory space than said spreadsheet file when in said first format and wherein said converting takes place outside of a memory of said second device, determine one or more formulas associated with said spreadsheet file that are necessary for the operation of the spreadsheet file on said second device, parse and evaluate the one or more formulas, and compile code associated with the one or more formulas while converting said spreadsheet file to said second format and
computer readable code configured to cause said conduit to transfer said spreadsheet file to said second device.

6. The computer program product of claim 5 wherein said first device is a computer.

7. The computer program product of claim 6 wherein said second device is a small device.

8. The computer program product of claim 7 wherein said small device is a Personal Digital Assistant (PDA).

9. A data processing system, comprising:
means for obtaining a spreadsheet file in a first format on a first device in the data processing system; and
means for converting said spreadsheet file to a second format associated with a second device in the data processing system, wherein the spreadsheet file in the second format occupies less memory space than the spreadsheet file in the first format and wherein the converting takes place outside of a memory of the second device and further comprises:
determining at least one formula associated with the spreadsheet file that is necessary for operation of the spreadsheet file on the second device;
parsing and evaluating the at least one formula and compiling code associated with the at least one formula while converting the spreadsheet file to the second format; and
transferring the spreadsheet file to the second device.

10. The system of claim 9, wherein the first device is a computer.

11. The system of claim 10, wherein the second device is a small device.

12. The system of claim 11, wherein said small device is a Personal Digital Assistant (PDA).

* * * * *